United States Patent Office 2,786,840
Patented Mar. 26, 1957

2,786,840

AMINOPYRIDAZONE COMPOUNDS AND THEIR MANUFACTURE

Jean Druey, Riehen, and Konrad Meier and Alexander Staehelin, Basel, Switzerland, assignors to Ciba Pharmaceutical Products, Inc., Summit, N. J.

No Drawing. Application April 26, 1955,
Serial No. 504,122

Claims priority, application Switzerland April 29, 1954

6 Claims. (Cl. 260—250)

This invention relates to aminopyridazone-(6) compounds of the formula

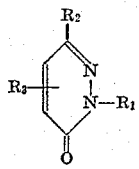

in which $R_1$ indicates a phenyl radical, $R_2$ is a hydroxyl group etherified with a lower aliphatic radical, and $R_3$ stands for an amino radical substituted by at least one lower aliphatic radical.

More particularly, the invention relates to compounds of the above formula in which $R_1$ is phenyl, $R_2$ is a lower alkoxy group, such as a methoxy, ethoxy or propoxy group, and $R_3$ is a lower monoalkylamino or dialkylamino group, in which the alkyl radicals are, for example, methyl, ethyl or propyl. Such compounds are designated herein as 1-phenyl-3-lower alkoxy-M-lower monoalkyl amino- or lower dialkylamino-pyridazone-(6) compounds, wherein M stands for one of the positions 4 and 5.

The invention is especially concerned with 1-phenyl-3-methoxy-4-dimethylamino-pyridazone-(6) of the formula

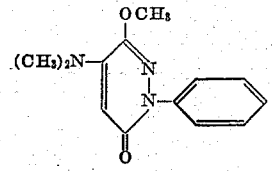

and 1-phenyl-3-methoxy-5-dimethylamino-pyridazone-(6).

The new compounds possess valuable pharmacological properties. Thus they possess an analgesic effect and are useful as analgesics.

The novel aminopyridazone-(6) compounds can be prepared by various methods. According to one procedure a compound of the formula

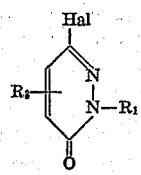

in which $R_1$ and $R_3$ have the same meaning as assigned thereto hereinabove, and Hal represents a halogen atom, for example, chlorine or bromine, is reacted with a lower aliphatic alcohol preferably in the form of an alcoholate. According to an alternative process, corresponding 3-hydroxyl compounds are converted into their ethers with lower aliphatic alcohols, for example, by reaction with reactive esters of the alcohols, especially esters with strong inorganic or organic acids, for example, sulfuric acid or hydrohalic acids, preferably in the presence of acid-binding agents, primarily such as are capable of alcoholate formation.

The new compounds can also be prepared by reacting a compound of the formula

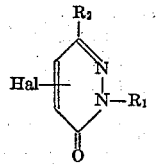

in which $R_1$, $R_2$ and Hal have the same meaning as assigned thereto hereinabove, is reacted with a lower aliphatic primary or secondary amine.

The above reactions are carried out, for example, in the presence or absence of diluents and/or condensing agents and/or catalysts, at ordinary or elevated temperature, in open vessels or in closed vessels under pressure.

The new compounds are utilized, for example, in the form of pharmaceutical preparations which contain them in admixture with an adjuvant which facilitates the administration thereof, such as phermaceutical organic or inorganic carrier materials suitable for enteral or parenteral application. As carriers such substances are employed as do not react with the new compounds, as for example gelatine, lactose, starch, magnesium stearate, talc, vegetable oils, benzyl alcohols, gums, polyalkylene glycols, petroleum jelly, cholesterol or other known medicament carriers. The pharmaceutical preparation can be made up, for example, as tablets, dragees, or in liquid form as solutions, suspensions or emulsions. They may, if desired, be sterilized and/or contain auxiliary substances, such as preservative, stabilizing, wetting or emulsifying agents, salts for variation of the osmotic pressure or buffer substances. They can also contain other substances of therapeutic value. The preparations are formulated by customary methods employed in pharmaceutical formulation.

The following examples illustrate the invention, the relation between parts by weight and parts by volume being the same as that between the gram and the cubic centimeter.

*Example 1*

0.4 part by weight of sodium is dissolved in 40 parts by volume of methanol and to the solution are added 4 parts by weight of 1-phenyl-3-chloro-4-dimethylamino-pyridazone-(6). The mixture is heated under reflux for 3 hours on the water bath. The methanol is then distilled off, the residue treated with water and extracted by shoking with chloroform. The dried organic solution is evaporated, the residue dissolved in hot benzene and the solution filtered through animal charcoal. After the addition of petroleum ether, the 1-phenyl-3-methoxy-4-dimethylamino-pyridazone-(6) of the formula

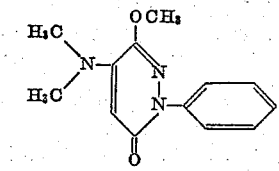

crystallizes in white needles of M. P. 100–101° C. The yield is 82%.

The 1-phenyl-3-chloro-4-dimethylamino-pyridazone-(6) used as starting material can be prepared as follows:

400 parts by weight of chloromaleic acid anhydride are boiled for three hours under reflux with 311 parts by volume of phenyl hydrazine and 2200 parts by volume of glacial acetic acid. After 15 hours' standing at 20° C., the precipitate is filtered off and washed with glacial acetic acid. It is purified by dissolving in dilute caustic soda solution, filtering and precipitating with dilute hydrochloric acid and crystallized from glacial acetic acid. The 1 - phenyl - 3 - hydroxy - 4 - chloro - pyridazone - (6) thus obtained melts with decomposition at 270° C.

85 parts by weight of this compound are heated for one hour to 100° C. with 680 parts by volume of phosphorus oxychloride. The solution is decomposed with ice-cold dilute caustic soda solution and extracted with ether. After drying over potassium carbonate, the ether is evaporated and the residue recrystallized from cyclohexane. The resulting 1-phenyl-3,4-dichloro-pyridazone-(6) melts at 138° C.

30 parts by weight of 1-phenyl-3,4-dichloro-pyridazone-(6) are suspended in 90 parts by volume of absolute alcohol and mixed with 52.5 parts by volume of 7 N-alcoholic dimethylamine solution. The temperature rises to 60° C. After the reaction has subsided, the mixture is heated on the water-bath until dissolution is complete, then filtered warm and allowed to stand overnight at 0° C. The crystallized 1-phenyl-3-chloro-4-dimethylamino-pyridazone-(6) is recrystallized once again from alcohol. Melting point: 127–128° C. Yield: 84%.

Example 2

12.5 parts by weight of 1-phenyl-3-chloro-5-dimethylamino-pyridazone-(6) are heated in a closed vessel with a solution of 1.2 parts by weight of sodium in 100 parts by volume of absolute methanol for 10 hours to 120–130° C. The product is filtered, the methanol distilled off, the residue taken up in ether and the ether solution, after washing with water, dried and evaporated. The remaining viscous oil is distilled under high vacuum. (Boiling point 133–135° C. under 0.03 mm. mercury pressure.) The yield is 94%. The distillate which becomes slowly permeated by crystals, is recrystallized from acetone-petroleum ether. There is thus obtained the 1-phenyl-3-methoxy-5-dimethylamino-pyridazone-(6) of the formula

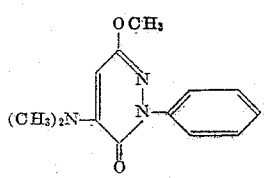

in coarse prisms of M. P. 57–57.5° C. The yield is 65%.

The 1 - phenyl - 3 - chloro - 5 - dimethylamino - pyridazone-(6) used as starting material can be prepared as follows:

282 parts by weight of 1-phenyl-3-hydroxy-pyriadzone-(6) are heated to gentle boiling while stirring in 1000 parts by volume of phosphorus oxychloride until dissolution is complete and hydrochloric acid is no longer evolved. 1000 parts by weight of phosphorus pentachloride are then added in five portions, and the whole is then heated again to the boil and refluxed for 12 hours. The reaction mass is then decomposed with a mixture of ice and water while stirring, the temperature being maintained below 50° C. by the addition of ice. The reaction product is taken up in methylene chloride, the solution washed with water and sodium carbonate solution and dried. After distilling off the solvent the 1-phenyl-3,5-dichloro-pyridazone-(6) is recrystallized from methanol. Its melting point it at 111–112° C.

48.2 parts by weight of 1-phenyl-3,5-dichloro-pyridazone-(6) dissolved in 100 parts by volume of absolute alcohol, are mixed with 250 parts by volume of 30% alcoholic dimethylamine solution while cooling. After the reaction has subsided, the mixture is heated for a further 2 hours in a sealed tube on the water-bath, the solvent is then distilled off, the residue taken up in methylene chloride and washed with water. After distilling off the methylene chloride, 1-phenyl-3-chloro-5-dimethylamino - pyridazone - (6) is recrystallized from methanol. Yellow prisms of melting point 87.5–88.5° C. are obtained. Yield: 84%.

Example 3

0.7 part by weight of potassium hydroxide and 2.31 parts by weight of 1-phenyl-3-hydroxy-4-dimethylamino-pyridazone-(6) are dissolved in 40 parts by volume of methanol, the solution heated to the boil, and mixed dropwise with 2 parts by volume of dimethyl sulfate in 20 parts by volume of methanol. During the boiling, the reaction mixture is kept alkaline by adding 2 N-potassium hydroxide occasionally. After 2 hours the methanol is distilled off in vacuo, the residue mixed with 10 N-caustic soda solution, and extracted with methylene chloride. The organic solution is dried and evaporated and the residue recrystallized from a mixture of ether and petroleum ether. There is thus obtained the 1-phenyl-3-methoxy-4-dimethylamino-pyridazone-(6) described in Example 1, melting at 100–101° C., in a yield of 75%.

The 1 - phenyl - 3 - hydroxy - 4 - dimethylamino - pyridazone-(6) used as starting material can be prepared as follows:

40 parts of 1-phenyl-3-hydroxy-4-chloro-pyridazone-(6) described in Example 1 are heated at 155–160° C. for 10 hours in a sealed bomb tube with 120 parts by volume of alcoholic 7 N-dimethylamine solution and 250 parts by volume of alcohol. The solution is then evaporated in vacuo, the residue dissolved in 2 N-caustic soda solution, the solution washed with chloroform, filtered through animal charcoal, and finally acidified with 2 N-hydrochloric acid. The precipitate is filtered with suction and dried in vacuo at 60° C. The yield is 69% and the melting point is 232–234° C. (decomposition).

Example 4

5 parts by weight of 1-phenyl-3-methoxy-5-chloro-pyridazone-(6) are heated in a closed tube for 4 hours to 90–100° C. with 10 parts by volume of 30% alcoholic dimethylamine solution and 90 parts by volume of absolute alcohol. After distilling off the alcohol, the residue is dissolved in methylene chloride and the solution washed with water. The oil which remains after distilling off the methylene chloride crystallizes on scratching the vessel with a glass rod and from its melting point and mixed melting point is found to be identical with the 1-phenyl-3-methoxy-5-dimethylamino-pyridazone-(6) described in Example 2. The yield is 86%.

The 1-phenyl-3-methoxy-5-chloro-pyridazone-(6) used as starting material can be prepared as follows:

11.1 parts by weight of 1-phenyl-3-hydroxy-5-chloro-pyridazone-(6) in 100 parts by volume of methanol, are stirred with 5.3 parts by volume of dimethyl sulfate at 40° C. and a solution of 1.15 parts by weight of sodium in 50 parts by volume of methanol is added dropwise. When the addition is complete the whole is boiled for 1 hour under reflux. After distilling off the methanol under vacuum, the residue is taken up in methylene chloride and the methylene chloride solution washed with 2 N-sodium carbonate solution for removal of unchanged starting material. After distilling off the methylene chloride, the residue is dissolved in hot isopropyl ether and the solution filtered hot with animal charcoal. It is then allowed to cool, filtered from separated by-product and the filtrate concentrated to one-third of its volume. By scratching the wall of the flask, 1-phenyl-3-methoxy-5-chloro-pyridazone-(6) crystallizes in colorless prisms. After recrystallization several times from isopropyl ether, the product melts at 83–84° C. The yield is 24%.

What is claimed is:

1. Amino-pyridazone-(6) compounds of the formula

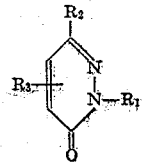

wherein $R_1$ stands for a phenyl radical, $R_2$ represents a lower alkoxy group and $R_3$ an amino group substituted by at least one lower alkyl radical.

2. 1-phenyl-3-lower alkoxy-M-lower dialkylamino-pyridazone-(6), wherein M stands for one of the positions 4 and 5.

3. 1-phenyl-3-lower alkoxy-4-lower dialkylamino-pyridazone-(6).

4. 1-phenyl-3-lower alkoxy-5-lower dialkylamino-pyridazone-(6).

5. 1-phenyl-3-methoxy-4-dimethylamino - pyridazone-(6).

6. 1-phenyl-3-methoxy-5-dimethylamino - pyridazone-(6).

No references cited.